(12) United States Patent
Gessner et al.

(10) Patent No.: US 8,861,485 B2
(45) Date of Patent: Oct. 14, 2014

(54) SELF-ORGANIZING COMMUNICATIONS NETWORK AND METHOD FOR THE OPERATION THEREOF

(75) Inventors: Christina Gessner, Munich (DE); Meik Kottkamp, Munich (DE)

(73) Assignee: Rohde & Schwarz GmbH & Co. KG, Munich (DE)

(*) Notice: Subject to any disclaimer, the term of this patent is extended or adjusted under 35 U.S.C. 154(b) by 422 days.

(21) Appl. No.: 13/055,488

(22) PCT Filed: Sep. 30, 2009

(86) PCT No.: PCT/EP2009/007031
§ 371 (c)(1),
(2), (4) Date: Jan. 24, 2011

(87) PCT Pub. No.: WO2010/046018
PCT Pub. Date: Apr. 29, 2010

(65) Prior Publication Data
US 2011/0122851 A1      May 26, 2011

(30) Foreign Application Priority Data

Oct. 22, 2008    (DE) .................. 10 2008 052 718

(51) Int. Cl.
| | |
|---|---|
| H04J 3/00 | (2006.01) |
| H04W 72/04 | (2009.01) |
| H04J 3/08 | (2006.01) |
| H04J 3/06 | (2006.01) |
| H04W 4/00 | (2009.01) |
| H04B 7/212 | (2006.01) |
| H04L 12/28 | (2006.01) |
| H04B 7/24 | (2006.01) |
| H04B 7/00 | (2006.01) |
| H04W 84/18 | (2009.01) |
| H04W 28/16 | (2009.01) |

(52) U.S. Cl.
CPC .......... *H04W 72/0426* (2013.01); *H04W 84/18* (2013.01); *H04W 28/16* (2013.01); *H04W 72/0446* (2013.01)
USPC ........... 370/336; 370/326; 370/329; 370/330; 370/331; 370/332; 370/337; 370/338; 370/347; 370/350; 370/431; 370/442; 370/508; 370/512; 455/39; 455/502

(58) Field of Classification Search
CPC ................................................. H04W 72/0426
USPC ......... 370/326, 329, 330, 335–338, 342, 347, 370/350, 431, 436, 442, 508–512; 455/39, 455/502
See application file for complete search history.

(56) References Cited

U.S. PATENT DOCUMENTS 6,496,851 B1 * 12/2002 Morris et al. ................. 709/204
7,068,629 B1   6/2006 Benz et al.
(Continued)

FOREIGN PATENT DOCUMENTS

| CN | 1282493 A | 1/2001 |
| CN | 1478352 A | 2/2004 |

(Continued)

OTHER PUBLICATIONS

International Preliminary Report on Patentability, PCT/EP2009/007031, May 5, 2011, pp. 1-7.

(Continued)

*Primary Examiner* — Un C Cho
*Assistant Examiner* — Peian Lou
(74) *Attorney, Agent, or Firm* — Ditthavong & Steiner, P.C.

(57) ABSTRACT

A radio communication network having at least two base stations. The base stations communicate with mobile stations using time slots. The time slots are divided into transmission slots, during which the base stations transmit messages, and receiving slots, during which the base stations receive messages. The base stations jointly determine an assignment of the time slots as transmission slots and receiving slots.

13 Claims, 8 Drawing Sheets

(56) References Cited

U.S. PATENT DOCUMENTS

| | | |
|---|---|---|
| 2003/0026234 A1 | 2/2003 | Zeira et al. |
| 2004/0228309 A1* | 11/2004 | Marinier ............... 370/336 |
| 2006/0215611 A1* | 9/2006 | Nakagawa et al. ....... 370/332 |
| 2007/0047495 A1* | 3/2007 | Ji et al. ............... 370/335 |
| 2007/0115878 A1 | 5/2007 | Ashish et al. |
| 2007/0140166 A1 | 6/2007 | Eichinger et al. |
| 2008/0117848 A1* | 5/2008 | Yang et al. ............. 370/311 |

FOREIGN PATENT DOCUMENTS

| | | |
|---|---|---|
| DE | 198 40 232 C1 | 10/1999 |
| EP | 0 720 405 A2 | 7/1996 |
| EP | 0 948 221 A2 | 10/1999 |
| EP | 1 892 971 A1 | 2/2008 |
| GB | 2 309 357 A | 7/1997 |
| JP | 2000165927 A | 6/2000 |
| WO | WO 96/34468 A1 | 10/1996 |
| WO | WO 97/09838 A1 | 3/1997 |
| WO | WO 98/36600 A2 | 8/1998 |
| WO | WO 99/26430 A1 | 5/1999 |
| WO | WO 01/11852 A2 | 2/2001 |
| WO | 2007061014 A1 | 5/2007 |

OTHER PUBLICATIONS

International Search Report, PCT/EP2009/007031, Jan. 22, 2010, pp. 34-39.

* cited by examiner

SELF-ORGANIZING COMMUNICATIONS NETWORK AND METHOD FOR THE OPERATION THEREOF

CROSS-REFERENCE TO RELATED APPLICATION

The present application is a national phase application of PCT Application No. PCT/EP2009/007031, filed on Sep. 30, 2009, and claims priority to German Application No. 10 2008 052 718.1, filed on Oct. 22, 2008, the entire contents of which are herein incorporated by reference.

BACKGROUND OF THE INVENTION

1. Field of the Invention

The invention relates to a timeslot radio-communications network and a method for the operation of a timeslot radio-communications network.

2. Discussion of the Background

Traditionally, in radio-communications networks, which are based on timeslot transmission methods (TDD—Time Division Duplex), fixed assignments of timeslots to transmission slots and reception slots are pre-determined. A modification during operation is not normally possible.

The problem with this method of operation is that in the case of a predominant transmission requirement or predominant reception requirement, the capacities of the radio-communications network are not exploited in an optimal manner.

A matching of the assignment of the timeslots to transmission slots and reception slots through a single base station is disclosed in EP 0 948 221 B1. A more favorable exploitation of capacities is possible in this manner. However, a negotiation with neighboring base stations does not take place. An optimization for one base station causes strong disturbances and a reduction of the transmission performance in neighbouring base stations. In the case of a new activation of base stations, high costs are required here for calibration.

SUMMARY OF THE INVENTION

The invention advantageously provides a radio-communications network and a method for the operation of a radio-communications network, which exploit the network capacities to a high degree, require low costs for setting up and maintenance and guarantee a low-interference message transmission.

A radio-communications network according to the invention provides at least two base stations. The base stations communicate with mobile stations within timeslots. The timeslots are subdivided into transmission slots, during which the base stations transmit messages, and reception slots, during which the base stations receive messages. The base stations jointly determine an assignment of the timeslots to transmission slots and reception slots. Accordingly, a distribution of the timeslots favorable for the network as a whole is guaranteed. An increase in the volume of transmitted messages is therefore possible and the requirements of all base stations within the network can be taken into consideration.

A first base station preferably transmits to a second base station a suggestion for the assignment of the timeslots to transmission slots and reception slots. The second base station preferably accepts the suggestion and preferably transmits an acknowledgement to the first base station. Alternatively, the second base station rejects the suggestion and preferably transmits a rejection to the first base station. In this manner, a rapid determination of the assignment is possible.

The second base station advantageously transmits to the first base station a second suggestion for the assignment of the timeslots to transmission slots and reception slots. Accordingly, a rapid determination of the assignment is possible, while maintaining a high overall message transmission.

At least one base station preferably provides a relatively higher priority than at least one other base station or, by even greater preference, than all other base stations. A suggestion for the assignment of the timeslots to transmission slots and reception slots by the base station of relatively higher priority is preferably always accepted by a base station of relatively lower priority. Accordingly, messages of preferred subscribers can be transmitted with increased reliability and reduced delay. In particular, the base station of relatively higher priority can be used as a starting point for the joint negotiation.

The base stations preferably determine their suggestions for the assignment of the timeslots to transmission slots and reception slots in each case dependent upon a message-transmission requirement. Accordingly, the overall transmission rate of the radio-communications network can be increased.

The base stations are preferably connected to one another via a radio connection and/or via a connecting line. The base stations preferably communicate via this radio connection and/or this connecting line. Accordingly, a communication of the base stations can be maintained in a flexible manner. Moreover, especially with a connecting line, a reliable communication is possible independently of the radio-communications network.

The base stations preferably exchange additional synchronization information. The base stations preferably synchronize the transmission slots and reception slots. Accordingly, a further reduction in disturbances and therefore an increase in the transmission rate of the radio-communications network is possible.

The base stations advantageously assign the timeslots in such a manner to transmission slots and reception slots that the number of timeslots not used for the transmission of messages is minimized. Accordingly, an optimization of the number of messages transmitted by means of the radio-communications network is possible.

After an activation of a further base station, the base stations preferably determine an assignment of the timeslots to transmission slots and reception slots jointly with the further base station. Accordingly, a self-organization and a self-healing of the radio-communications network is possible.

BRIEF DESCRIPTION OF THE DRAWINGS

The invention is described by way of example below on the basis of the drawings, in which an advantageous exemplary embodiment of the invention is presented. The drawings are as follows.

DETAILED DESCRIPTION OF EXEMPLARY EMBODIMENTS OF THE INVENTION

Figure 1:
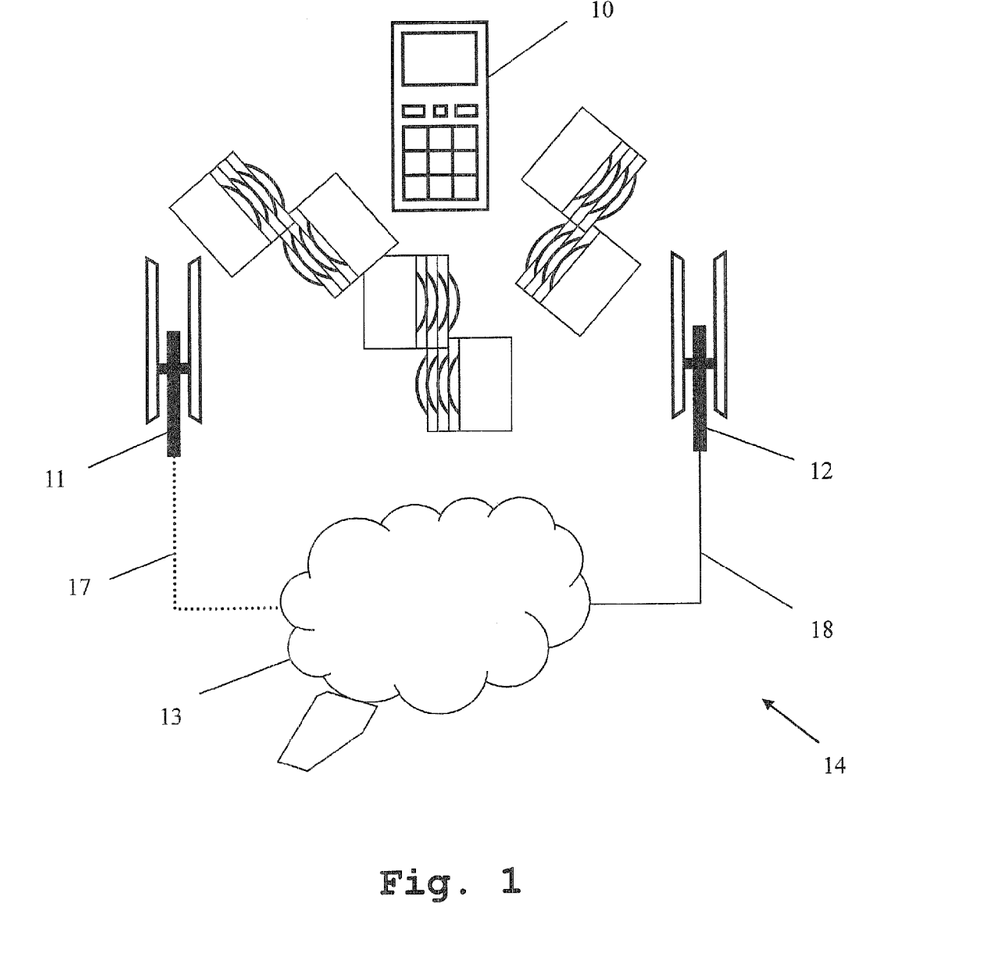
FIG. 1 shows a first exemplary embodiment of the radio-communications network according to the invention.
Figure 2:
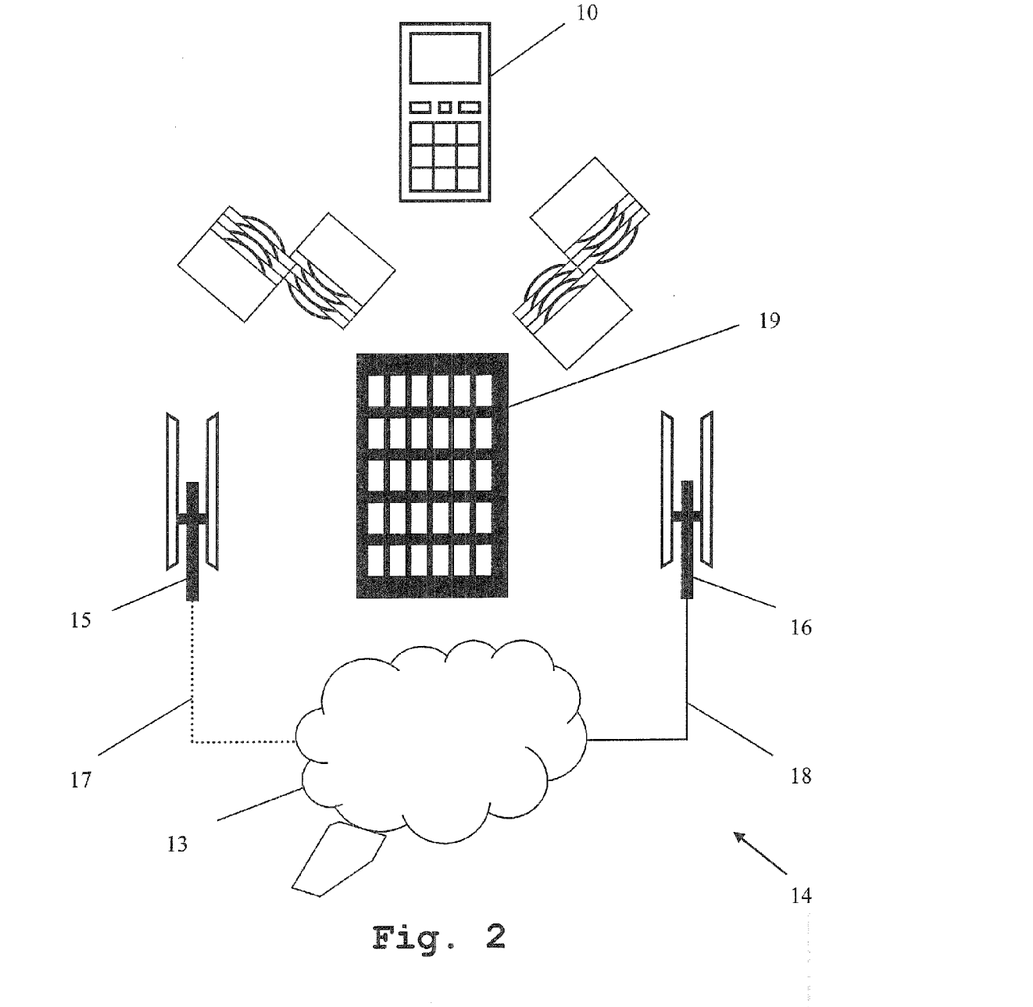
FIG. 2 shows a second exemplary embodiment of the radio-communications network according to the invention.

Initially, with reference to FIGS. 1-2, the structure and the general manner of functioning of the radio-communications network according to the invention are explained. By means of FIGS. 3-5, details of the radio-communications network according to the invention and of the method according to the invention are presented with reference to different assignments of timeslots. By means of FIGS. 6-7, the method according to the invention is then explained in greater detail on the basis of two exemplary embodiments. On the basis of FIGS. 8-10, the method of functioning of various exemplary embodiments of the method according to the invention is then explained further with reference to communications examples. Finally, on the basis of FIGS. 11-12, the synchronization is considered in greater detail. A repetition of the presentation and description of identical elements in similar drawings has not been provided in some cases.

In FIG. 1, a first exemplary embodiment of the radio-communications network according to the invention is presented. A radio-communications network 14 contains two base stations 11, 12 and a network 13. The network 13 is connected in this context by means of a wireless connection 17 to the first base station 11 and can contain further base stations, which are not illustrated. By means of a connecting line 18, the network 13 is connected to the second base station 12. A mobile station 10 is in radio contact with the radio-communications network 14. The two base stations 11, 12 in this exemplary embodiment provide a visual connection with one another.

The base stations 11, 12 transmit largely identical signals in a common frequency range. All of the mobile stations 10 share this frequency range. For example, the signals of the individual mobile stations can be separated via a code-multiplex method.

The radio-communications network uses a timeslot method. That is to say, in the time domain, signals, which are transmitted from the base stations 11, 12, are separated from signals, which are received from the base stations 11, 12. A given time portion (frame) is subdivided into a fixed number of timeslots (slot). In this context, every timeslot provides the same length. Each timeslot is used either for the transmission of messages by the base stations 11, 12 or for the reception of messages by the base stations 11, 12. The messages received by the base stations 11, 12 are transmitted from the mobile stations 10. Every timeslot is therefore either a transmission slot or a reception slot. This approach starts from the side of the base stations 11, 12. Accordingly, every timeslot provides an identical duration. Accordingly, with a uniform transmission standard, an identical volume of messages can be transmitted via each timeslot. Conventionally, a fixed distribution of transmission slots and reception slots is used. However, this leads to a reduced efficiency, because an exploitation of the capacities of all timeslots is not guaranteed. According to the invention, a variable assignment of the timeslots to transmission slots and reception slots is used. The base stations 11, 12 jointly assign transmission slots and reception slots to the timeslots. Different distributions of timeslots dependent upon transmission requirements of the base stations 11, 12 will be discussed in greater detail with reference to FIGS. 3-5.

The function of the joint assignment will be discussed in greater detail with reference to FIGS. 6-10.

The synchronization of the timeslots of the different base stations 11, 12 continues to be problematic. As a result of inaccuracies of the system clocks and as a result of latencies of the synchronization signalization via the network 13, an incomplete synchronization of the base stations 11, 12 is obtained. This is problematic especially in this exemplary embodiment because of the visual connection of the two base stations 11, 12. An incomplete synchronization in this case leads to a direct irradiation of the transmission slot, for example, of the second base station 12 projecting in time into the reception slot, for example, of the first base station 11. This leads to a very low signal-noise ratio and accordingly to a high bit-error rate during the overlap period. In particular, in the case of the visual connection of the base stations, as precise a synchronization as possible is therefore of great importance.

The synchronization is achieved, in that the base stations investigate the quality of the present synchronization and determine common time periods of the timeslots.

Accordingly, for example, the first base station 11 determines an erroneous synchronization of 3 ms by determining a very high bit-error rate in the first 3 ms after a start of timeslot. Following this, the first base station 11 transmits to the second base station 12 a suggestion for the assignment of the timeslots to transmission slots and reception slots. This assignment contains precise details of the time periods of the timeslots. The second base station 12 accepts this suggestion and transmits back an acknowledgement. If the synchronization has not yet been optimally adjusted, the process is repeated. The second base station 12 could also modify the suggestion on the basis of its own self-measured quality of the synchronization and send this back to the first base station 11 as a new suggestion. The process of synchronization is repeated regularly. Additionally, it is initiated, if a high bit-error rate is determined.

The procedure and the function of the synchronization will be explained in greater detail on the basis of FIGS. 11-12.

If a further base station is added to an existing radio-communications network 14, the former jointly determines an assignment of the timeslots together with the existing base stations 11, 12. Accordingly, a synchronization also takes place. The radio-communications network 14 therefore implements a self-configuration of the new base station. If the connection to a base station 11, 12, which was already part of the radio-communications network 14, is interrupted, the procedure for self-healing is implemented as in the case of a new base station.

FIG. 2 shows a second exemplary embodiment of the radio-communications network according to the invention. The exemplary embodiment is largely identical with the exemplary embodiment presented in FIG. 1. The base stations 15, 16 correspond to the base stations 11, 12 from FIG. 1. However, the base stations 15, 16 do not provide a direct visual connection. The visual connection is blocked by a building 19. Accordingly, the base stations 15, 16 cannot implement precise synchronization measurements, because a direct propagation path is not available. Instead, a plurality of propagation paths is determined. However, a very precise synchronization of the timeslots in this exemplary embodiment is of low importance, because an overlap of the transmission slots and reception slots of the base stations 15, 16 achieves only a relatively slight effect. Moreover, a similar interference effect is triggered by the multi-path propagation.

Figure 3:
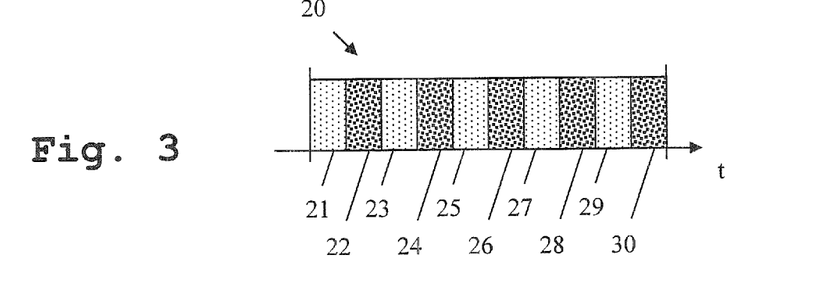
FIG. 3 shows a first assignment according to the invention of timeslots.

FIG. 3 presents a first assignment according to the invention of timeslots 20. In this context, half of the timeslots 20 are assigned to transmission slots 21, 23, 25, 27, 29. The other half of the timeslots 20 are assigned to reception slots 22, 24, 26, 28, 30. This assignment is determined jointly by the base stations dependent upon their respective message-transmission requirement. This method will be described in greater detail on the basis of FIGS. 6-10. An assignment as presented here is selected by the base stations, if the requirement of the base stations to transmit messages is of a similar magnitude to the requirement of the base station to receive messages, that is to say, as the requirement of mobile stations to transmit messages.

Figure 4:
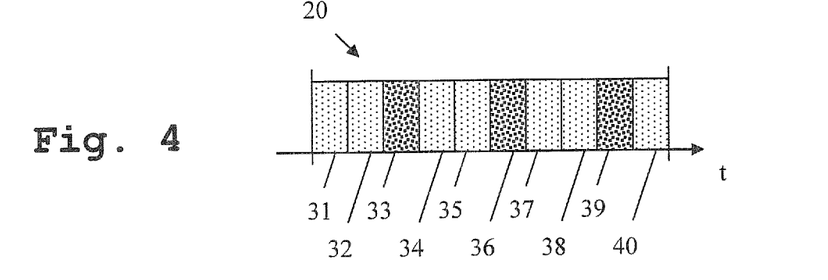
FIG. 4 shows a second assignment according to the invention of timeslots.

FIG. 4 shows a second assignment according to the invention of timeslots 20. With this exemplary embodiment, the transmission slots 31, 32, 34, 35, 37, 38, 40 outweigh the reception slots 33, 36, 39. The cause for this is an increased transmission requirement of the base stations.

Figure 5:
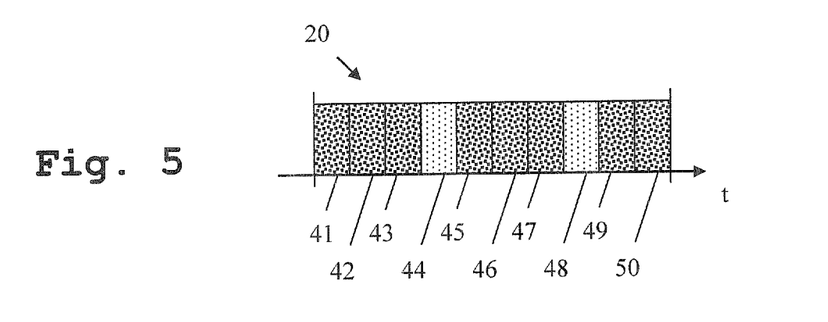
FIG. 5 shows a third assignment according to the invention of timeslots.

FIG. 5 presents a third assignment according to the invention of timeslots 20. With this exemplary embodiment, the reception slots 41, 42, 43, 45, 46, 47, 49, 50 outweigh the transmission slots 44, 48. The reason for this is an increased reception requirement of the base stations.

Figure 6:
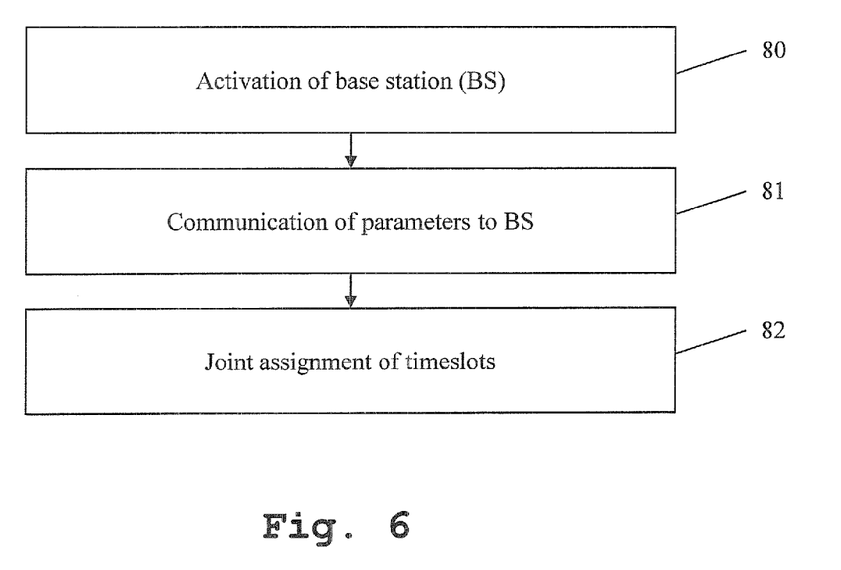
FIG. 6 shows a first exemplary embodiment of the method according to the invention in a flow chart.

FIG. 6 shows a first exemplary embodiment of the method according to the invention in a flow chart. With the activation of a new base station or the re-activation of a base station temporarily taken out of operation, the base station is initially activated in a first step 80. In a second step 81, communications parameters such as the modulation method and coding method used are transmitted via the network 13 from FIG. 1 and FIG. 2 to the newly activated base station. In a third step 82, the newly activated base station and the already activated base stations jointly determine the assignment of timeslots to transmission slots and reception slots on the basis of their respective message-transmission requirements. The procedure of this assignment determination will be discussed in greater detail with reference to FIG. 7 below.

Figure 7:
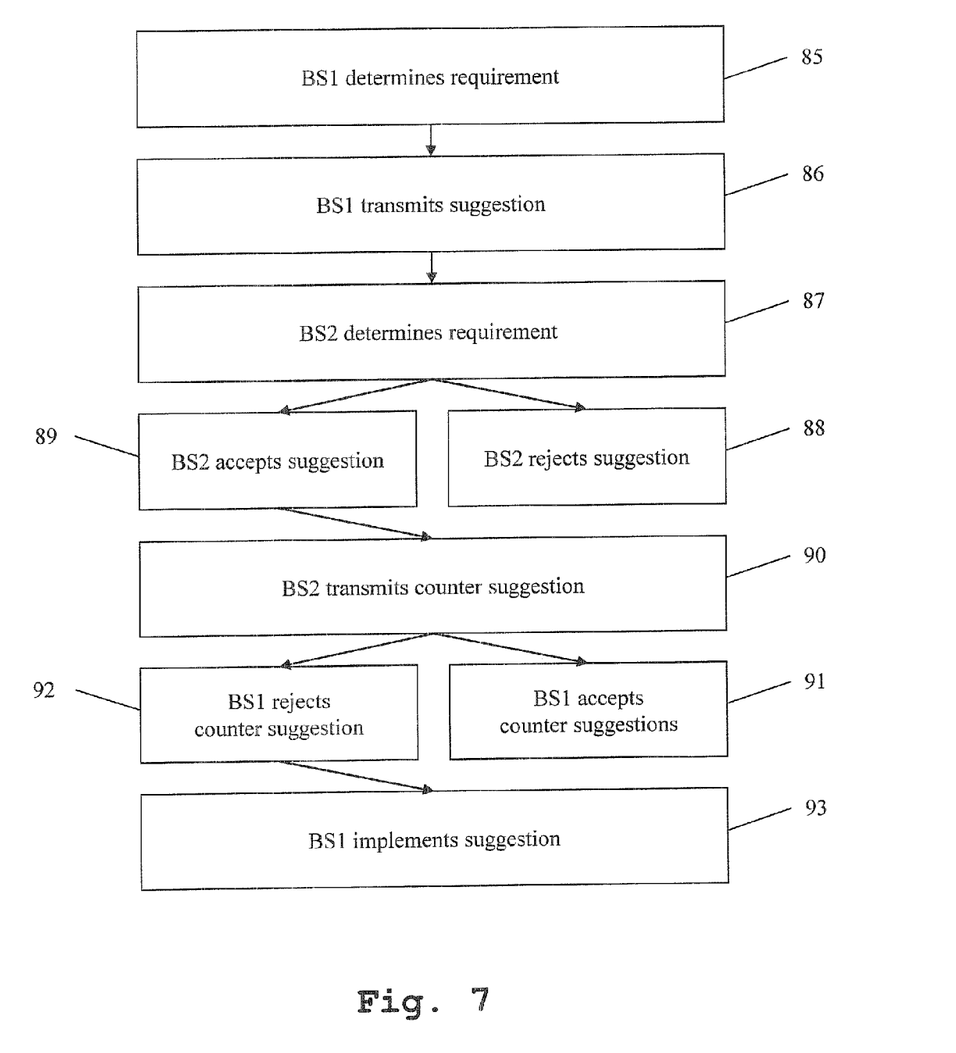
FIG. 7 shows a second exemplary embodiment of the method according to the invention in a flow chart.

FIG. 7 shows a second exemplary embodiment of the method according to the invention in a flow chart. The method shown here is used for the new activation of a base station as shown in FIG. 6 and also in existing radio-communications networks. In existing radio-communications networks, it is initiated at regular intervals in order to implement an optimization. Beyond this, it is used for the removal of interference.

In a first step 85, the message-transmission requirement of a first base station is determined. This contains both its transmission requirement and also its reception requirement, that is to say, the transmission requirement of the mobile stations communicating with it. In a second step 86, a suggestion for the assignment of the timeslots to transmission slots and reception slots is made by the first base station on the basis of its message-communication requirement and transmitted to a second base station. In a third step 87 after the reception of the suggestion, the second base station determines its own message communication requirement. If the own message communication requirement of the second base station agrees adequately with the suggestion of the first base station, the suggestion is accepted by the second base station in a fourth step 88, and a corresponding message is transmitted to the first base station. The determination of the assignment is then completed. The new assignment is used from a timing point contained within the suggestion.

If the message communication requirements and the suggestion do not match adequately, the second base station rejects the suggestion in an alternative fourth step 89 and transmits a corresponding message to the first base station. In a fifth step 90, a counter suggestion is transmitted by the second base station to the first base station. The counter suggestion is based upon the message communication requirement of the second base station. In this context, the counter suggestion takes into consideration the suggestion of the first base station and presents a compromise between the two assignments. If the message communication requirement of the first base station and the counter suggestion match adequately, the first base station accepts the counter suggestion in a sixth step 91 and transmits a corresponding message to the second base station. The determination of the assignment is then completed. The new assignment is used from a timing point contained in the counter suggestion.

If the message communication requirement and the counter suggestion do not match adequately, the first base station rejects the suggestion in an alternative sixth step 92 and transmits a corresponding message to the first base station. The first base station in this exemplary embodiment provides a relatively higher priority than the second base station. In a seventh step 93, the first base station transmits a new suggestion to the second base station. On the basis of the relatively higher priority of the first base station, it implements this suggestion. The second base station accepts this suggestion. The determination of the assignment is then completed. The new assignment is used from a timing point contained in the suggestion implemented.

As an alternative to the implementation of the suggestion, further repetitions of the mutual sending of suggestions could take place. However, this requires a long time and unnecessarily ties up system resources and transmission bandwidth.

Figure 8:
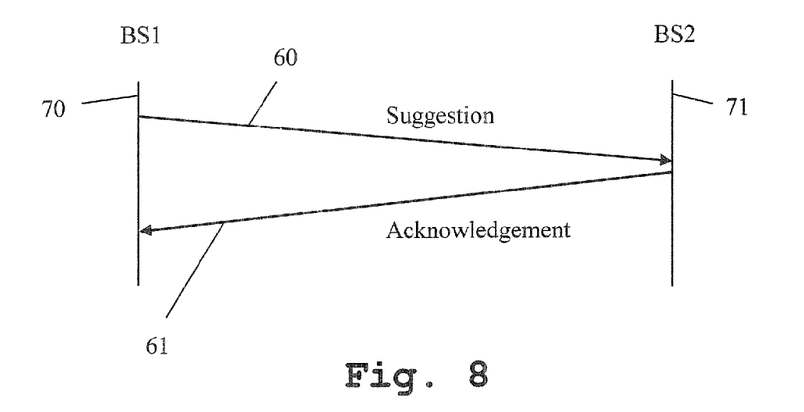
FIG. 8 shows a third exemplary embodiment of the method according to the invention in a diagram of the communications procedure.

FIG. 8 shows a third exemplary embodiment of the method according to the invention in a diagram of the communications procedure. A first base station 70 transmits to a second base station 71 a suggestion 60 for the assignment of the timeslots. The suggestion 60 in this context is based upon the message communication requirement of the first base station 70 or respectively of mobile stations communicating with this base station 70. The second base station 71 is in agreement with this suggestion and transmits an acknowledgement 61 to the first base station 70. At a timing point determined in the suggestion 60, the new assignment of the timeslots is implemented.

Figure 9:
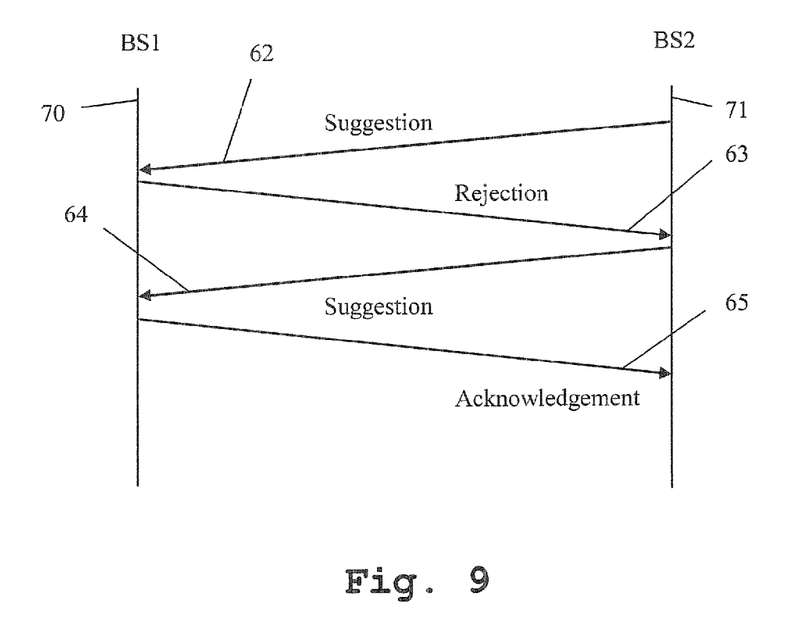
FIG. 9 shows a fourth exemplary embodiment of the method according to the invention in a diagram of the communications procedure.

FIG. 9 shows a fourth exemplary embodiment of the method according to the invention in a diagram of the communications procedure. Here, the second base station 71 transmits a suggestion 62 for the assignment of the timeslots to the first base station 70. However, the message communication requirement of the first base station 70 differs significantly from the requirement of the second base station 71. Accordingly, the first base station 70 transmits a rejection 63 to the second base station 71. The second base station adapts its suggestion 62 at least partially to the requirement of the first base station and transmits to the first base station 70 a second suggestion 64 for the assignment of the timeslots. This second suggestion 64 fulfils the message communication requirement of the first base station 71 adequately well. The first base station 70 then transmits an acknowledgement to the second base station 71. Here also, the new assignment of the timeslots is implemented at a timing point established in the suggestion 64.

The base stations 70, 71 in this context provide different priorities. If no agreement of the base stations 70, 71 can be reached regarding an assignment of the timeslots, a base station of relatively higher priority can implement a suggestion against the message communication requirement of a base station of relatively lower priority. As an alternative, a consideration of a priority of mobile stations communicating with the respective base stations or individual communications events is possible. Accordingly, every mobile station or respectively every communications event, for example, call, data transmission, etc., provides a priority. This priority is adopted by the respective base station.

Figure 10:
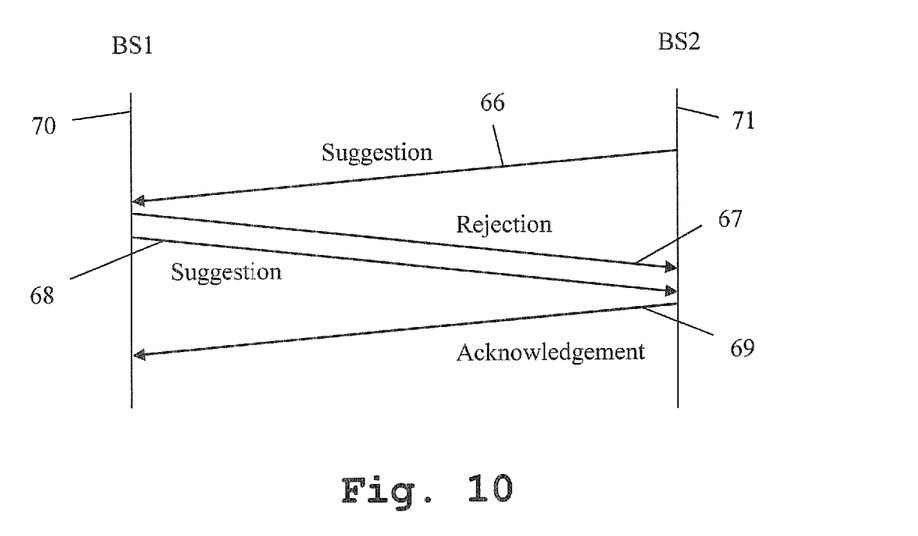
FIG. 10 shows a fifth exemplary embodiment of the method according to the invention in a diagram of the communications procedure.

FIG. 10 shows a fifth exemplary embodiment of the method according to the invention in a diagram of the communications procedure. Here, the second base station 71 initially transmits a suggestion 66 for the assignment of the timeslots to the first base station 70. The first base station 70 transmits a rejection 67 back to the second base station 71. Even before waiting for a further suggestion from the second base station 70, it transmits a counter suggestion 68 to the second base station 71. The second base station 71 is in agreement with this suggestion 68 and transmits an acknowledgement 69 to the first base station 70. This modified method shortens the duration of the joint determination for the assignment of the timeslots.

Figure 11:
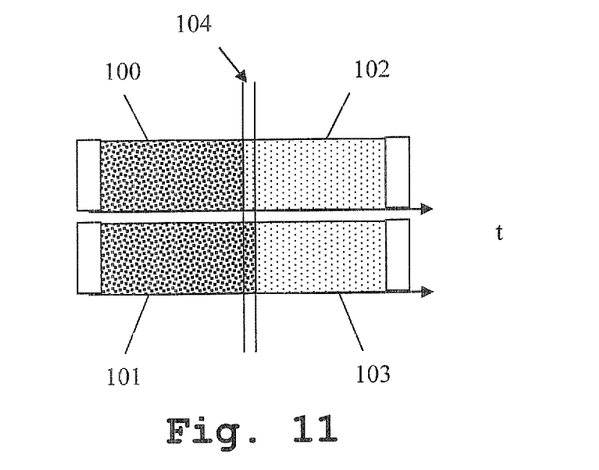
FIG. 11 shows a first exemplary assignment of timeslots.

In FIG. 11, a first exemplary assignment of timeslots of two base stations is presented. The transition from a reception slot 100 to a transmission slot 102 of a first base station is illustrated in the upper part of the diagram. The transition from a reception slot 101 to a transmission slot 103 of a second base station is illustrated in the lower part of the diagram. However, the timeslots 100, 101, 102, 103 of the two base stations are not synchronized in an optimal manner. The transition of the reception slots 100, 101 to the transmission slots 102, 103 is offset by an interval 104. During this interval 104 large disturbances occur. This leads to a high bit-error probability. This high bit-error probability can be measured. A synchronization procedure is initiated. This will be explained in greater detail with reference to FIG. 12 in the section below.

Figure 12:
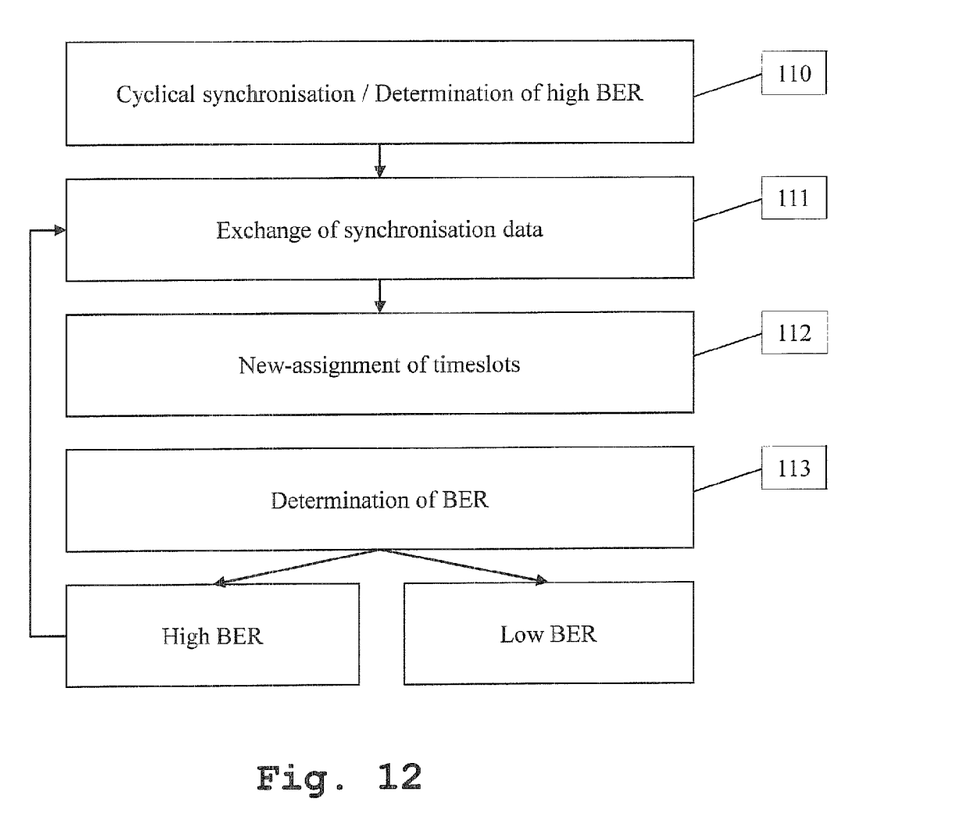
FIG. 12 shows a sixth exemplary embodiment of the method according to the invention in a flow chart.

FIG. 12 shows a sixth exemplary embodiment of the method according to the invention in a flow diagram. In a first step 110, the synchronization is initiated. This can occur either automatically at regular intervals in order to optimize the transmission or can be triggered by the measurement of a high bit-error probability (BER). In a second step 111, the base stations exchange synchronization data. This can occur either via a connecting line or via a radio connection. An exchange via timeslots specially assigned for this purpose is also possible. The synchronization data contain the quality of the synchronization measured by the respective base station. In a third step 112, the timeslots are newly assigned jointly by the base stations. In this context, the synchronization data are also taken into consideration. The joint assignment of the timeslots is described in detail with reference to FIG. 7. In a fourth step 113, the bit-error rate is once again determined. If a low bit-error rate is determined, the synchronization procedure is concluded. If a high bit-error rate is established, the synchronization procedure is repeated from the second step 111. Such a repetition does not occur with an arbitrary frequency. From a given number of repetitions, the threshold of the bit-error rate not to be exceeded for the successful synchronization is raised.

The invention is not restricted to the exemplary embodiment presented. As already mentioned, different communications standards can be used. Moreover, a joint determination of the assignment of the timeslots based upon more complex rules is possible. All of the features described above or illustrated in the drawings can be advantageously combined with one another as required within the framework of the invention.

The invention claimed is:

1. A radio-communications network comprising at least two base stations, wherein the base stations communicate within timeslots with mobile stations, wherein the timeslots are subdivided into transmission slots, during which the base stations transmit messages, and reception slots, during which the base stations receive messages, wherein the base stations are set up in such a manner that they jointly determine an assignment of the timeslots to transmission slots and reception slots, and wherein a first base station determines a message transmission and reception requirement of the first base station with respect to the mobile stations communicating with the first base station and transmits to a second base station a first suggestion based on the message transmission and reception requirement for the assignment of the timeslots to the transmission slots and the reception slots, wherein the second base station determines a second message transmission and reception requirement of the second base station with respect to the mobile stations communicating with the second base station, and determines, based on the second message transmission and reception requirement, if it accepts the first suggestion, and wherein the second base station transmits an acceptance message to the first base station if it accepts the first suggestion, and, transmits a rejection to the first base station if it rejects the first suggestion, and a second suggestion for the assignment of the time slots to the transmission slots and the reception slots.

2. The radio-communications network according to claim 1, wherein at least one base station provides a higher priority than at least one other base station, and wherein the base station of lower priority is set up in such a manner that a suggestion for the assignment of the timeslots to transmission slots and reception slots by the base station of higher priority is always accepted by the base station of lower priority.

3. The radio-communications network according to claim 1, wherein the base stations are connected to one another for the communication with one another via at least one of a radio connection and a connecting line.

4. The radio-communications network according to claim 1, wherein the base stations exchange synchronization information, and wherein the base stations synchronize the transmission slots and reception slots.

5. The radio-communications network according to claim 1, wherein, through the base stations, the timeslots are assignable to transmission slots and reception slots in such a manner that the number of timeslots not used for the transmission of messages is minimized.

6. The radio-communications network according to claim 1, wherein the base stations determine jointly, after an activation of a further base station, with the further base station an assignment of the timeslots to transmission slots and reception slots.

7. A method for operation of a radio-communications network with at least two base stations,
- wherein the base stations communicate with mobile stations within timeslots,
- wherein the timeslots are subdivided into transmission slots, during which the base stations transmit messages, and reception slots, during which the base stations receive messages,
- wherein an assignment of the timeslots to transmission slots and reception slots is determined jointly by the base stations,
- wherein a message transmission and reception requirement of a first base station with respect to the mobile stations communicating with the first base station is determined,
- wherein a first suggestion for the assignment of the timeslots to the transmission slots and the reception slots based on the determined message transmission and reception requirement is transmitted from the first base station to a second base station,
- wherein the second base station determines a second message transmission and reception requirement of the second base station with respect to the mobile stations communicating with the second base station, and determines, based on the second message transmission and reception requirement, if it accepts the first suggestion,
- wherein, if the first suggestion is accepted by the second base station, an acceptance message is transmitted from the second base station to the first base station, and
- wherein, if the first suggestion is rejected by the second base station, a rejection and a second suggestion for the assignment of the timeslots to transmission slots and reception slots are transmitted from the second base station to the first base station.

8. The method according to claim 7,
- wherein at least one base station provides a higher priority than at least one other base station, and
- wherein a suggestion for the assignment of the timeslots to transmission slots and reception slots by the base station of higher priority is always accepted by the base station of lower priority.

9. The method according to claim 7,
- wherein the base stations communicate via at least one of a radio connection and a connecting line, by which they are connected to one another.

10. The method according to claim 7,
- wherein synchronization information is exchanged by the base stations, and wherein the transmission slots and reception slots are synchronized by the base stations.

11. The method according to claim 7,
- wherein the timeslots are assigned by the base stations to transmission slots and reception slots in such a manner that the number of timeslots not used for a transmission of messages is minimized.

12. The method according to claim 7,
- wherein an assignment of the timeslots to transmission slots and reception slots after an activation of a further base station is determined jointly by the base stations and the further base station.

13. The radio-communications network according to claim 1,
- wherein the base stations determine their suggestions for the assignment of the timeslots to transmission slots and reception slots in each case dependent upon a respective message-transmission requirement.

* * * * *